United States Patent [19]

Murakami

[11] Patent Number: 5,653,247
[45] Date of Patent: Aug. 5, 1997

[54] WHEEL CLEANING ASSEMBLY

[75] Inventor: Frank A. Murakami, Santa Fe Springs, Calif.

[73] Assignee: D.I.S. Inc., Santa Fe Springs, Calif.

[21] Appl. No.: 514,569

[22] Filed: Aug. 14, 1995

[51] Int. Cl.6 .................................................. B08B 9/00
[52] U.S. Cl. ........................ 134/80; 134/142; 134/153; 134/102.3
[58] Field of Search .................................... 134/160, 164, 134/83, 80, 48, 142, 153, 147, 102.3, 76, 77, 148

[56] References Cited

U.S. PATENT DOCUMENTS

| | | | |
|---|---|---|---|
| 1,520,676 | 12/1924 | Koppin | 134/160 |
| 1,644,384 | 10/1927 | Kendall | 134/77 |
| 2,158,687 | 5/1939 | Biggert, Jr. et al. | 134/77 |
| 2,189,451 | 2/1940 | Peters | 134/48 |
| 2,319,501 | 5/1943 | Gora | 134/142 |
| 2,535,111 | 12/1950 | Wishart | 134/77 |
| 2,811,163 | 10/1957 | Weber et al. | 134/83 |
| 2,927,521 | 3/1960 | Smith | 134/77 |
| 3,073,324 | 1/1963 | Finston | 134/83 |
| 3,096,774 | 7/1963 | Rand | 134/48 |
| 3,153,419 | 10/1964 | Evans et al. | 134/142 |
| 3,270,855 | 9/1966 | Harper et al. | 134/142 |
| 3,382,844 | 5/1968 | Kumpf | 134/160 |
| 4,485,761 | 12/1984 | Stewart | 134/77 |
| 5,098,744 | 3/1992 | Enegren | 134/134 |
| 5,513,666 | 5/1996 | Fujiwara | 134/76 |

*Primary Examiner*—Frankie L. Stinson
*Attorney, Agent, or Firm*—Edgar W. Averill, Jr.

[57] ABSTRACT

A wheel cleaning assembly which has a rotatable carousel which supports a number of wheel raising and lowering arms. The carousel turns in time sectors and has a delay period after the carousel has turned one sector. For instance, at one station a wheel is lowered into a tank and retained in a lowered position for a time period after which it is raised and the carousel turns one sector. Each position of delay is a wheel cleaning station and wheel-cleaning stations, including a hot water soak, a spinning and spraying station, a cold water spray and a spinning and air drying station are included.

17 Claims, 3 Drawing Sheets

WHEEL CLEANING ASSEMBLY

BACKGROUND OF THE INVENTION

The field of the invention is metal polishing and the invention relates more particularly to the cleaning of a polished article and more particularly to a polished wheel. Many motor vehicles use decorative, highly polished aluminum wheels which, of course, must be polished and cleaned prior to sale. The polishing step includes the use of a polishing compound which is difficult to remove from a freshly polished wheel. The polishing compound typically includes a greasy or waxy substance which makes the removal particularly difficult. In the past, a common method of cleaning such wheels is to place the wheel to be cleaned on a turntable in a drum. The wheel is then sprayed with high pressure hot water which causes the wheel to spin. Next it is removed from the barrel, hand washed and wiped, inspected and packaged. A typical wheel cleaning line employs seven workers and is a labor-intensive process. A method of power washing articles is shown in U.S. Pat. No. 3,102,057 which shows a machine for washing articles under high pressure followed by draining and drying. A method utilizing a room-sized chamber is shown in U.S. Pat. No. 5,167,720 designed for cleaning jet engine components. U.S. Pat. No. 5,226,971 shows a method and apparatus for refinishing wheels. None of these devices would be useful for cleaning the polishing compound from a highly polished aluminum wheel.

SUMMARY OF THE INVENTION

It is an object of the present invention to provide an apparatus and a method for cleaning polished wheels which requires essentially no hand cleaning after the apparatus has completed its cycle.

The present invention is for an apparatus for cleaning polished wheels. The wheels to be cleaned have an inner rim and an outer rim, each rim having a wheel diameter. The wheels also have a polished face and an inner face. The apparatus has a wheel supporting frame held on a floor. At least one wheel support arm is held by the frame and the arm is moveable with respect to the floor. Means are provided for raising and lowering the wheel support arm between a lowered position and a raised position and the difference between these positions being at least one wheel diameter. After the wheel is raised, the carousel is turned to move the wheel in a downstream direction to a subsequent cleaning step. At least one soak tank is held on the floor and positioned so that as a wheel is lowered it will move into the soak tank and after it is raised it can be passed out of the soak tank. It is next moved to a wheel spinning and spraying station which spins the wheel while spraying it with hot water. Next the wheel is moved to a cold water spray station after which it is again spun and impacted with air to remove any remaining cold water. The result is a wheel which can be removed from the apparatus and not require any additional significant cleaning steps. The method of the present invention includes the steps of soaking a wheel to be cleaned in a hot water tank. The wheel is then removed and spun while impinging it with a stream of high pressure hot water. Next the wheel is sprayed with cold, purified water after which it is again spun while being impinged with a stream of air to dry off any remaining cold, purified water.

DESCRIPTION OF THE PREFERRED EMBODIMENTS

Figure 1:
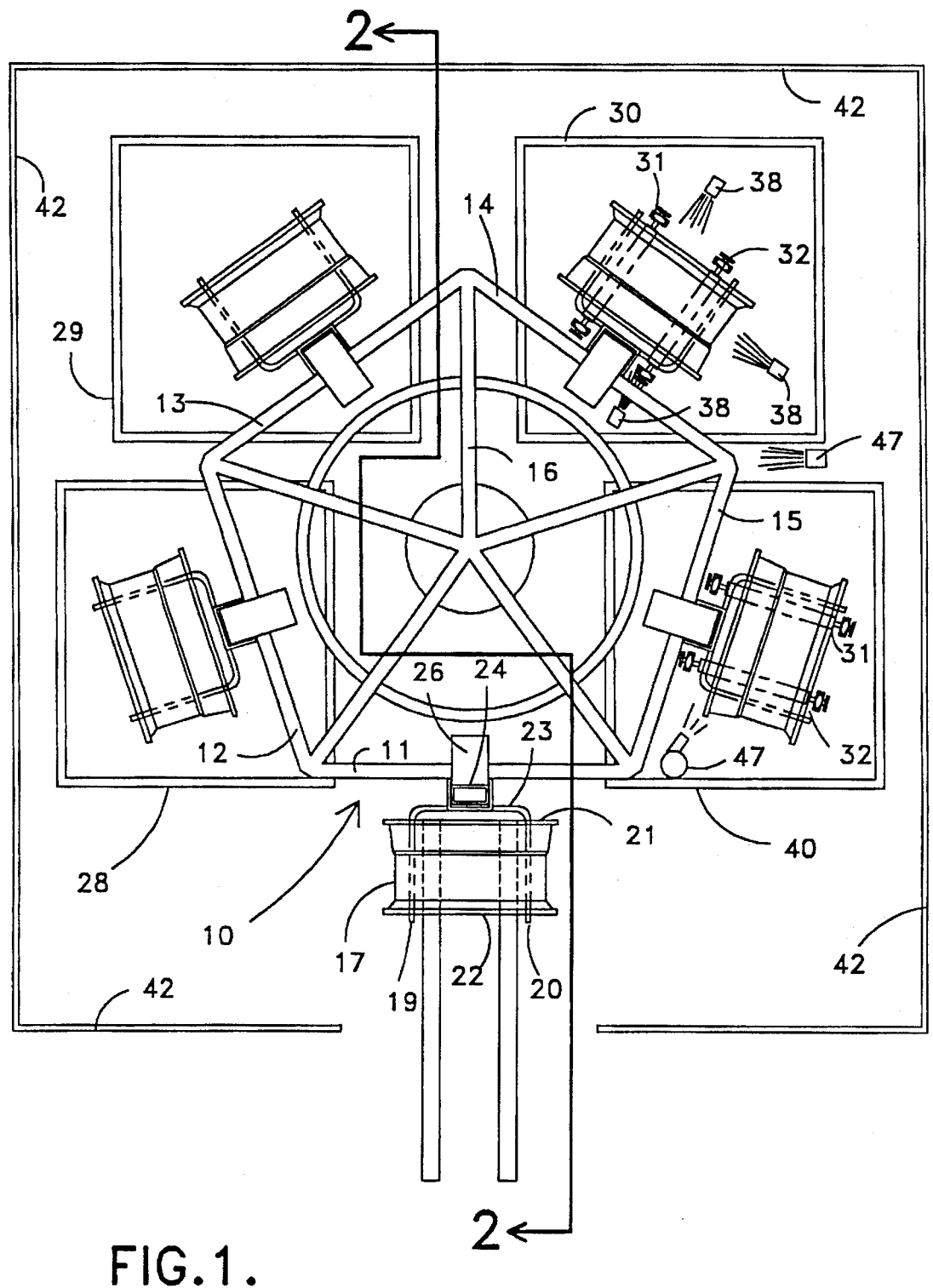
FIG. 1 is a plan view of the wheel cleaning apparatus of the present invention.
Figure 2:
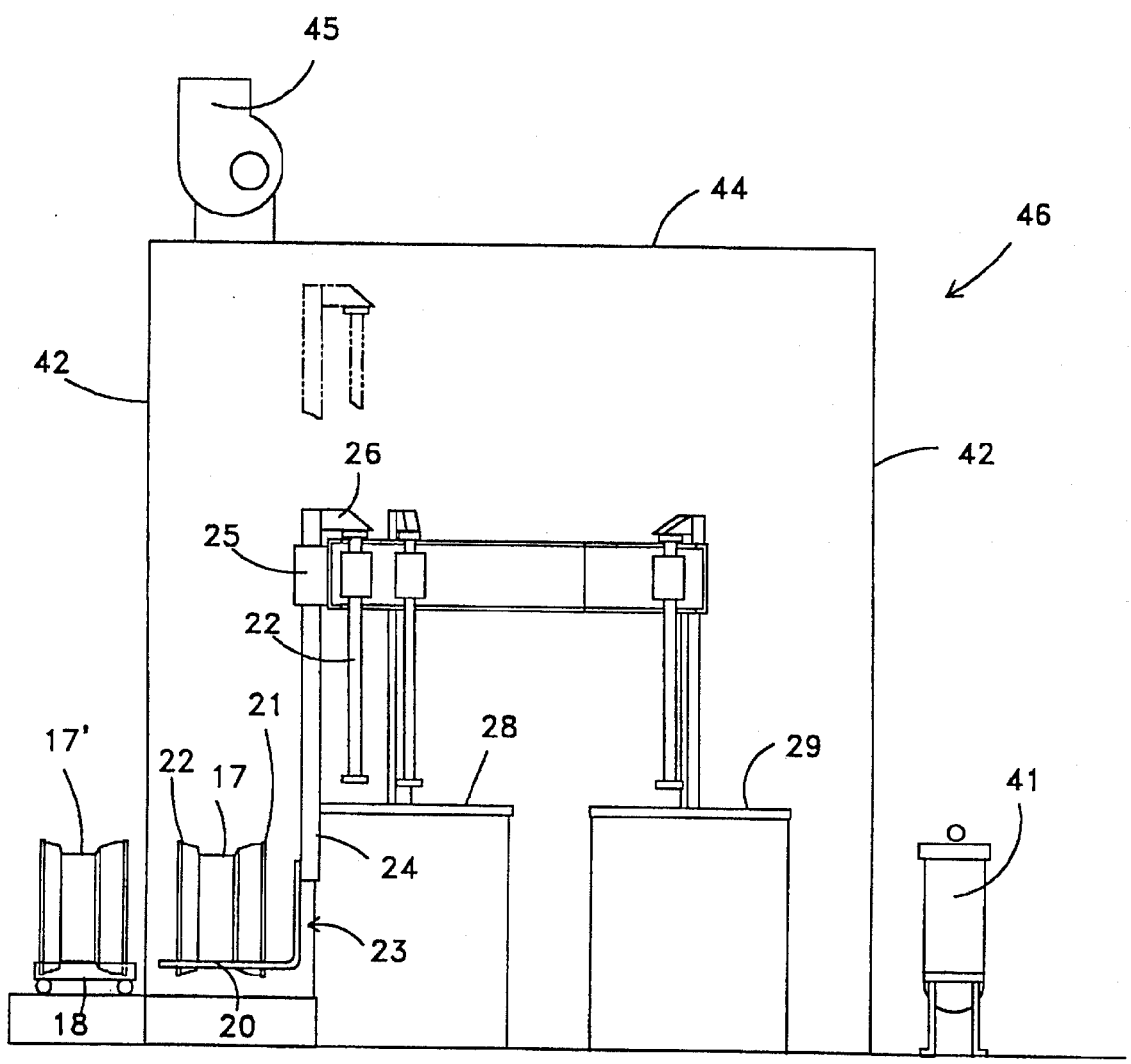
FIG. 2 is a cross-sectional view taken along line 2—2 of FIG. 1.

The wheel cleaning apparatus of the present invention is shown in plan view in FIG. 1 and includes a rotatable carousel 10. Carousel 10 has five arms 11, 12, 13, 14 and 15 which are supported on a rotatable frame 16. Frame 16 is rotated periodically 72° so that it stops at each of five stations as shown in FIG. 1. A wheel to be cleaned 17 is shown in phantom view at the first station which is a wheel loading and removal station. As shown in FIG. 2 wheel 17' is shown on a cart 18. Cart 18 is moved inwardly or to the right as viewed in FIG. 2 where a pair of forks 19 and 20 pass under the inner rim 21 and the outer rim 22. Forks 19 and 20 are held on a fork support assembly 23 which is held on a vertical moveable arm 24. Arm 24 in turn is vertically held in a channel 25 which is welded or otherwise affixed to arm 11 of carousel 10. A plate 26 is welded to the top of arm 24 and is also connected to an air cylinder 27 which raises and lowers the fork support assembly 23.

Figure 3:
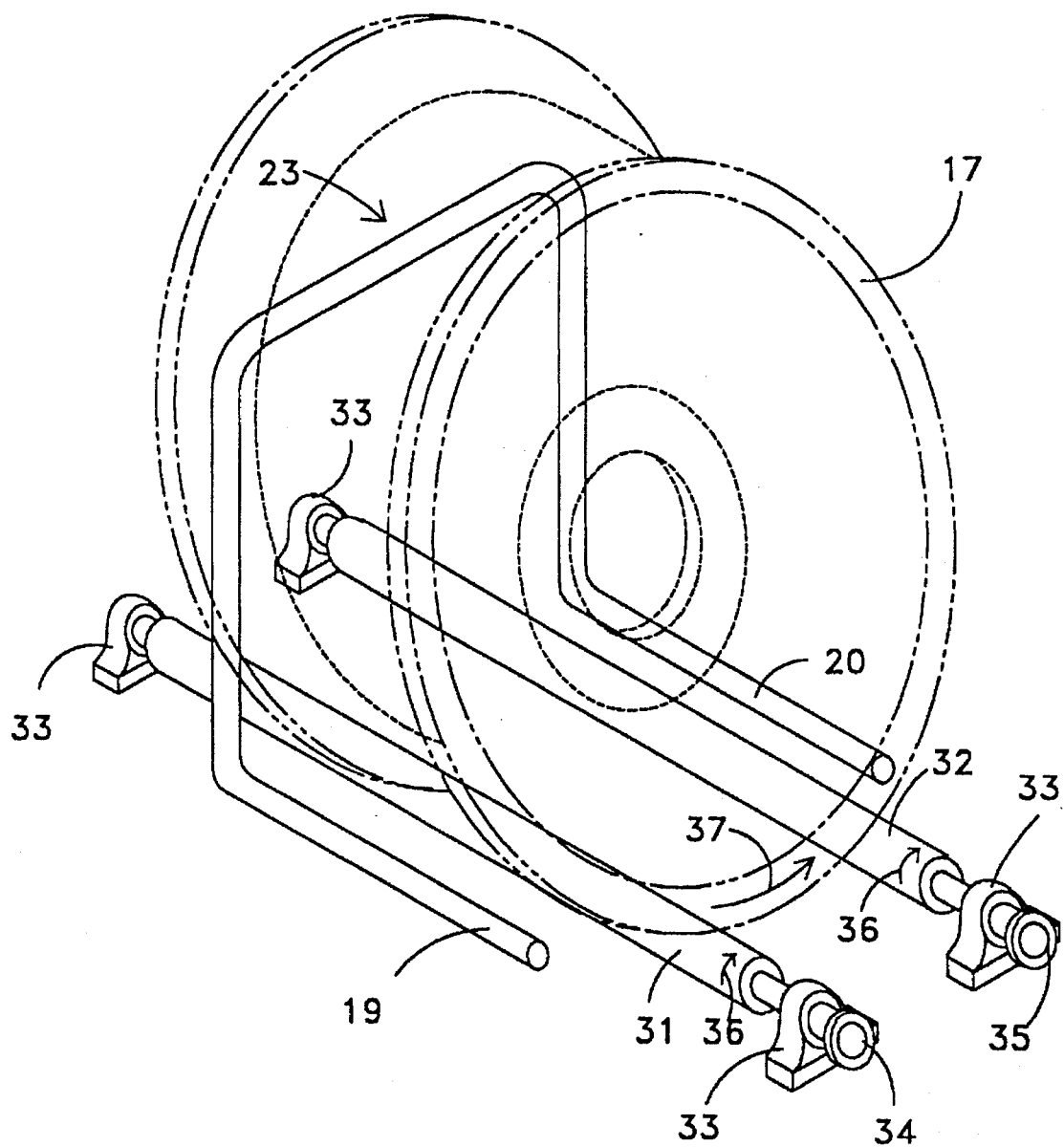
FIG. 3 is a perspective view of the wheel lifting forks and the wheel spinning apparatus of the assembly of FIG. 1.

Thus, after wheel 17 has been rolled over forks 19 and 20 the air cylinder 27 is activated to raise the wheel and the fork support assembly 23 to the raised position shown in phantom view in FIG. 2 after which the carousel is rotated clockwise 72°. The wheel must be raised at least the diameter of the wheel so that a raised wheel will pass over a tank wall and a lowered wheel can be completely immersed. This places the wheel in the position shown by arm 12 in FIG. 1 where the wheel is over hot water soak tank 28. The air pressure in the cylinder has been reduced and the wheel 17 is lowered into soak tank 28 where it is completely immersed in neutral cleaning solution. The wheel is retained under water for approximately one minute after which it is again raised by air cylinder 27 after which carousel 10 again turns clockwise 72°. Wheel 17 is now in the position shown by arm 13 in FIG. 1 and over tank 29 which is a second soak tank where the wheel is again completely immersed for about one minute. Next the wheel is again raised, the carousel moved an additional 72° sector so that wheel 17 is over tank 30. Tank 30 is a tank wherein the wheel is spun and impinged with hot water. The interior of tank 30 is shown in perspective view in FIG. 3 where the wheel is shown after the fork assembly 23 has been lowered. A pair of rubber coated steel rollers 31 and 32 are held by bearing assemblies 33. Rollers 31 and 32 are turned by a drive belt, not shown, which turns pulleys 34 and 35 which drives the rollers in the direction shown by arrows 36. This turns the wheel in a counter clockwise direction as indicated by arrow 37. This spinning step is carried out at a speed of at least 60 rpm and preferably about 80 rpm. While wheel 17 is spinning, it is impinged with high pressure, filtered hot water from three nozzles 38. This spraying step should be carried out with very high pressure water such as at least 1,000 psi and preferably about 1,500 psi. The temperature of the water should also be quite hot such as 160° F. Again, the cycle time within tank 30 is about one minute after which the spinning is stopped and the wheel is lifted from tank 30 and as it is being turned 72°, wheel 17 is sprayed with a mist of cold reverse osmosis water from nozzle 47'. The spinning step of a speed of at least 60 rpm and preferably about 80 rpm for a period of about one minute would provide between about 60 and 80 rotations, thus providing a multiplicity of revolutions. The water can be refrigerated or used at ambient temperature which causes the hot wheel to be quickly cooled after which it reaches the position shown by arm 15 in FIG. 1. The wheel is again lowered into tank 40 where it is again spun by a pair of rotating rollers 31 and 32, also at approximately 80 rpm, where the wheel is blown off with room temperature air from blower 47 while being spun. Again, this step lasts approximately one minute after which the wheel is again lifted and the carousel turned back to its original position where the clean dry wheel is removed from cart 18 and a dirty wheel placed on cart 18 for the same procedure. Of course, five wheels are held by the carousel at any one time and, thus, a clean wheel can be removed every minute and requires very little additional processing.

Filters such as filter 41 are provided to continuously clean the various tanks so that no solids need to be wasted to the drain. Preferably the carousel 10 is held in a room having walls 42, a floor 43 and a ceiling 44. Blowers 45 pull air from the room 46 and maintain a slight negative pressure so that the moist air does not contaminate the cleaned wheel. It also retain the area surrounding room 46 in a cooler condition since blowers 45 exhaust the moist air to the atmosphere outside of any building in which room 46 is located.

The result of the use of the apparatus of the present invention is a substantial savings in labor. There is no significant vertical lifting required by any workmen and, thus, injury to workmen is reduced. Wheels of different diameters can be readily cleaned by the apparatus of the present invention as long as forks 19 and 20 are positioned closer together than wheel diameter 40.

While a pair of forks 19 and 20 are shown in the drawings as a method of supporting the wheel, other support methods could, of course, be used, fashioned for the particular shape and geometry of the wheel being handled. The forks, however, are a preferred way of carrying this out because they are capable of easily depositing a wheel on the rubber coated rollers for spinning. While the term "purified" water is used herein, this term is intended to indicate water which has no significant amount of minerals such as that resulting from distillation or reverse osmosis.

The essential steps of the method of the present invention include soaking the wheel to be cleaned in a hot water tank. After the wheel has been removed from the hot water tank, it is spun while being impinged with a stream of high pressure hot water. Next, the wheel is cooled with purified water. Lastly, the wheel is again spun while being impinged with blow off air which can be at room temperature. While this is preferably carried out on a carousel in that it requires only one person to load and unload the device from a single station, it could, of course, be carried out on a straight line with a person at one end loading wheels to be cleaned and a person at the other end removing and boxing cleaned wheels. The carousel, however, is advantageous to reduce the space required for this operation and also facilitates the enclosure of the device in a closed room.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. Apparatus for cleaning polished wheels, the wheels to be having an inner rim and an outer rim, each rim having a wheel diameter, a polished face and an inner face, said apparatus comprising:

a floor;

a wheel supporting frame held on said floor;

at least one wheel support arm held by said frame;

means for moving said wheel support arm with respect to said floor in a downstream direction from a start position to a finish position;

means for raising and lowering said at least one wheel support arm with respect to said floor between a lowered position and a raised position the difference between said lowered and raised positions being at least said wheel diameter;

at least one soak tank supported by said floor, said soak tank having an outer peripheral wall with a top edge, said top edge having a height below a position of a wheel when the wheel support arm is in a raised position;

a wheel spinning and spraying station supported by said floor adjacent said at least one soak tank and having means for spinning said wheel is a multiplicity of revolutions while spraying said wheel;

at least one water spray nozzle positioned downstream from said wheel spinning and spraying station, said at least one water spray nozzle being aimed to wet and cool a wheel after it leaves said wheel spinning and spraying station;

a blow off station positioned downstream from said water spray nozzle, said blow off station having blower means for forcing a stream of air against a wheel after it has been wetted and cooled by said at least one spray nozzle; and a wheel removal station where a wheel leaving the blow off station may be removed from the said at least one wheel support arm.

2. The apparatus for cleaning polished wheels of claim 1 wherein said at least one wheel support arm comprises a pair of horizontal forks separated from each other a fork separation distance which is less than the wheel diameter, said pair of horizontal forks being held by a fork support assembly which is held by said wheel supporting frame.

3. The apparatus for cleaning polished wheels of claim 1 wherein the wheel supporting frame is a carousel.

4. The apparatus for cleaning polished wheels of claim 3 wherein said carousel is timed to turn in timed increments so that it is stationary for a timed period at each station.

5. The apparatus for cleaning polished wheels of claim 4 wherein said timed period is about one minute.

6. The apparatus for cleaning polished wheels of claim 1 wherein said spraying step sprays purified water.

7. The apparatus for cleaning polished wheels of claim 1 wherein said wheel spinning is accomplished by a pair of parallel rotatable rollers which are separated from one another a distance less than said wheel diameter.

8. The apparatus for cleaning polished wheels of claim 1 wherein the blow off station includes means for spinning a wheel while the blower means is forcing air against the wheel.

9. The apparatus for cleaning polished wheels of claim 1 wherein said spinning is at a speed of about 80 rpm.

10. The apparatus for cleaning polished wheels of claim 1 wherein the wheel spinning and spraying station sprays high pressure hot water on the wheel as it is spinning.

11. A carousel assembly for cleaning polished wheels, the wheels to be cleaned having an inner rim and an outer rim, an inner face and a outer face and the rims having a wheel diameter, said assembly comprising:

a carousel frame supported on a floor;

a carousel rotatingly supported by said carousel frame;

means for periodically turning the carousel in timed segments to provide a waiting time at a plurality of wheel cleaning stations and a turning time;

a plurality of wheel supporting members held by said carousel;

means for raising and lowering said wheel supporting members in a predetermined manner;

a first station comprising a hot water soak tank;

a spinning and spraying station downstream from said first station, said spinning and spraying station including means for spinning a wheel being cleaned in a multiplicity of revolutions while at the same time spraying the wheel;

a purified water spraying station downstream from said spinning and spraying station and including at least one water spraying nozzle;

a spinning and blowing station downstream from said purified water spraying station and including means for spinning a wheel being cleaned while at the same time, blowing air on the wheel.

12. The carousel assembly of claim 11 wherein said wheel supporting member comprises a pair of horizontal forks separated from each other a fork separation distance which is less than the wheel diameter, said pair of horizontal forks being held by a fork support assembly which is held by said carousel.

13. The carousel assembly of claim 12 wherein said means for spinning a wheel comprises a pair of parallel rotatable rollers which are separated from one another a distance less than said fork separation distance.

14. The carousel assembly of claim 11 further including a second hot water soak tank downstream of said first hot water soak tank.

15. The carousel assembly of claim 11 wherein said spinning and spraying station includes spraying hot water at a pressure in excess of 1,000 psi.

16. The carousel assembly of claim 15 wherein said spraying is at a pressure of about 1,500 psi.

17. The carousel assembly of claim 11 wherein the carousel and all stations are enclosed with an enclosure which includes an exhaust port and fan for providing less than atmospheric air pressure within said enclosure.

* * * * *